United States Patent [19]

Brown

[11] Patent Number: 4,681,178
[45] Date of Patent: Jul. 21, 1987

[54] VEHICULAR AIR INTAKE SCOOP

[75] Inventor: Robert R. Brown, Mt. Clemens, Mich.

[73] Assignee: Colt Industries Inc, New York, N.Y.

[21] Appl. No.: 794,831

[22] Filed: Nov. 4, 1985

[51] Int. Cl.⁴ ............................................. B60K 13/02
[52] U.S. Cl. ............................ 180/68.3; 55/DIG. 28; D12/181
[58] Field of Search .................... 180/68.3, 68.2, 68.1, 180/69.2, 69.24; 55/385 B, DIG. 28; D12/181; 98/2.16, 2.17, 2.12, 2.13; 40/622

[56] References Cited

U.S. PATENT DOCUMENTS

| D. 212,877 | 12/1968 | Kraus | D12/181 |
|---|---|---|---|
| 2,033,731 | 3/1936 | Nallinger | 180/68.3 |
| 2,367,904 | 1/1945 | Ulrich | 98/2.16 |
| 3,289,555 | 12/1966 | Steenberg | 40/622 |
| 3,481,119 | 12/1969 | McKinlay | 180/68.3 |
| 4,440,555 | 4/1984 | Chichester | 55/385 B |
| 4,539,766 | 9/1985 | Fast | 40/622 |

OTHER PUBLICATIONS

"Super Van Scoop", R. V. Dealer, Apr. 1973, p. 161.

Primary Examiner—David M. Mitchell
Attorney, Agent, or Firm—Walter Potoroka, Sr.

[57] ABSTRACT

An air scoop is shown for use in combination with a vehicle having an engine air intake port located in a side panel of a body panel of the vehicle; the scoop has a forward inlet and a rearward discharge end; the scoop extends outwardly beyond the normal contour of the vehicular body so that the inlet functions as a scoop-like inlet while the discharge end serves to direct such air as flows into the air scoop into the engine air intake port.

13 Claims, 19 Drawing Figures

VEHICULAR AIR INTAKE SCOOP

FIELD OF THE INVENTION

This invention relates generally to vehicles and more particularly to vehicular engine induction systems and still more particularly to adaptive means for directing ambient air to such engine induction systems.

BACKGROUND OF THE INVENTION

Certain automotive vehicles have been designed to have the engine thereof mounted generally at the rear of the vehicle or at a location often referred to as a mid-engine position. Mid-engine vehicles are generally of the type wherein the engine is mounted as to be situated closely behind or aft of the driver. It has been the practice in both types of rear-mounted engine vehicles, especially so with the mid-engine vehicles, to provide engine induction air from a port or intake opening formed in and located as at the side of the vehicular body. In some of such vehicles such an air intake opening is formed in what could be referred-to as the rear quarter body panel and forwardly of the rear wheels. In at least some of such vehicles, the air intake opening is actually an aperture defined by a portion of the vehicle body panel which is generally indented from the surrounding portion of the vehicle body panel and a further portion of the vehicle body panel, immediately forwardly thereof, is formed as to gradually slope from the otherwise normal contour of the vehicle body panel to generally the indented level or position of the air intake opening. Often, a grille, as for example, in the form of a set of louvers, is situated in the air intake opening to prevent the insertion of foreign objects into the air intake opening.

As a consequence, especially of such side-located air intake ports, as vehicular speed increases the static air pressure at the air intake port decreases and such decrease in static air pressure at least tends to minimize the power available from the engine.

Accordingly, the invention as herein disclosed and claimed is primarily directed to the solution of the problem of such reduced static air pressure.

SUMMARY OF THE INVENTION

According to the invention, an air scoop for use in combination with a vehicle having an engine air intake port located in a side panel portion of a body panel of said vehicle comprises air scoop body means, said scoop body means comprising a forward inlet end and a rearward discharge end, said scoop body means being such as to extend outwardly of the normal contour of said side panel portion when operatively connected thereto whereby said inlet end functions as a scoop-like inlet for air, and wherein said discharge end serves to direct air flowing into said scoop body means into said engine air intake port.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
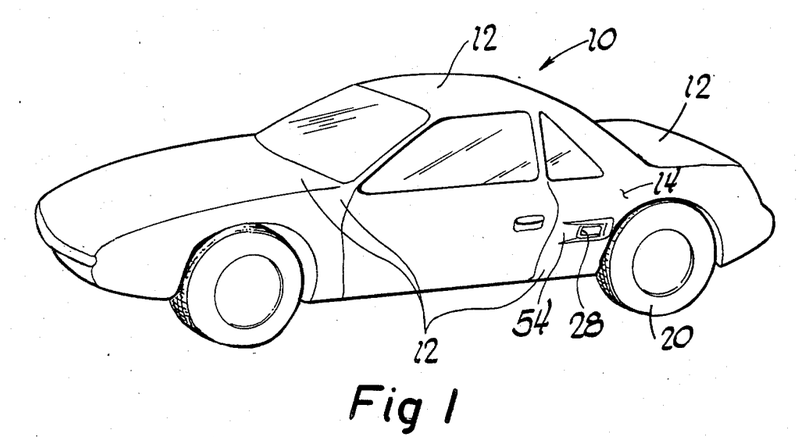
FIG. 1 is a perspective view of, by way of example, a mid-engine automotive vehicle having engine air intake port means formed as in a side panel portion of the vehicular body.

Referring now in greater detail to the drawings, FIG. 1, by way of example, illustrates a mid-engine automotive vehicle 10 having an outer body 12 comprised of side body panel means portion 14 which may be referred to as a rear quarter panel.

Figure 2:
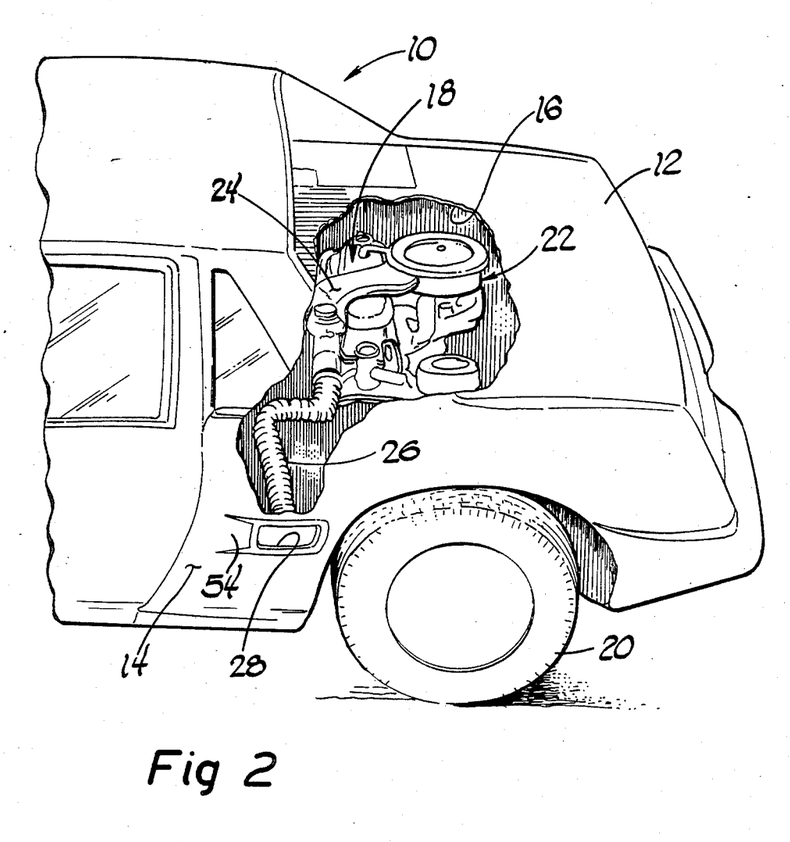
FIG. 2 is a relatively enlarged fragmentary portion of the vehicle of FIG. 1 with portions thereof broken away as to generally illustrate the air induction passage means leading to the vehicular engine.

FIG. 2, an enlarged fragmentary portion of the vehicle 10 of FIG. 1, is depicted as having a portion 16 of the outer body broken away as to illustrate the vehicular engine 18 which is depicted as being situated transversely of the vehicle 10 and generally forwardly of the rear ground-engaging wheels one of which is shown at 20. The engine air induction means may comprise suitable engine air intake filter assembly means 22 which, in turn, may include an air passage 24 operatively secured to the housing of the air intake filter assembly means 22. A flexible conduit means 26 may have one end suitably secured to the inlet of air passage means 24 and have its other end operatively secured to the internal side of quarter panel 14 as to effectively surround an air intake aperture or passage 28 formed in body quarter panel 14.

Figure 3:
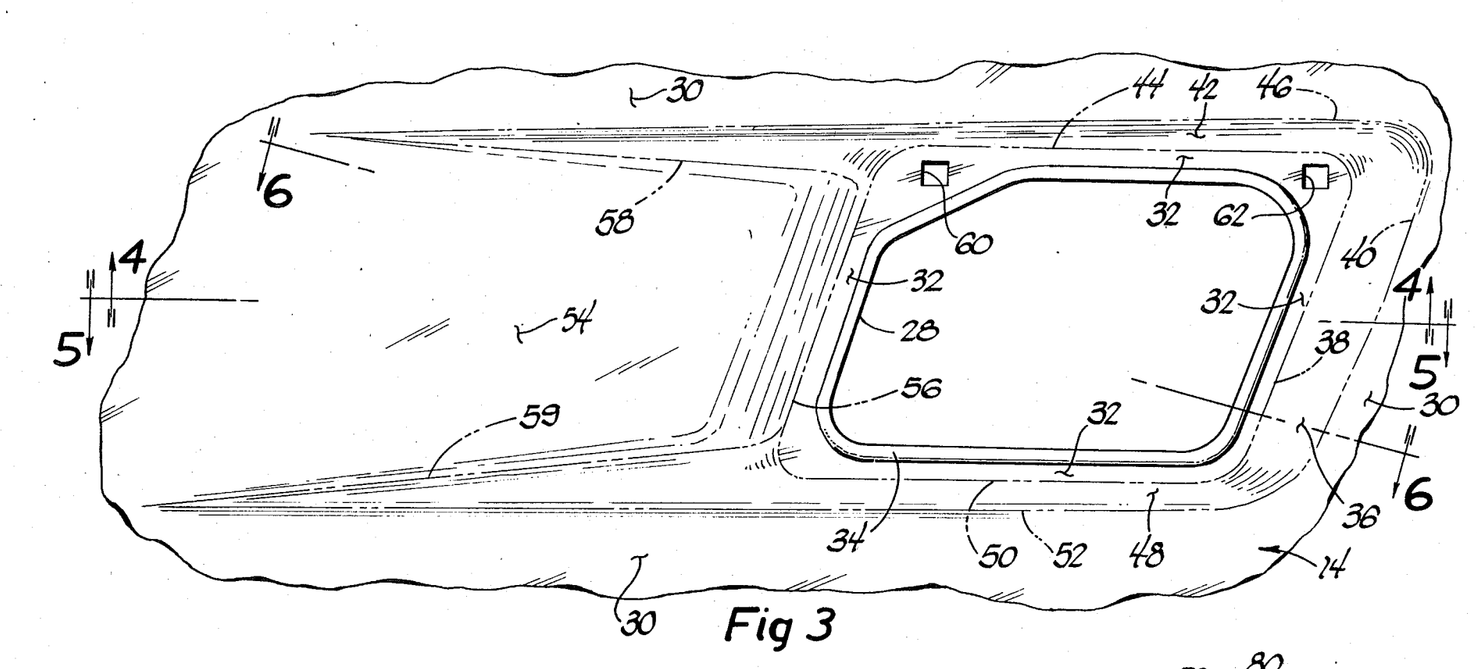
FIG. 3 is a relatively enlarged view, in elevation, of a fragmentary portion of the vehicular side body panel generally circumscribing the air intake port means.
Figure 4:
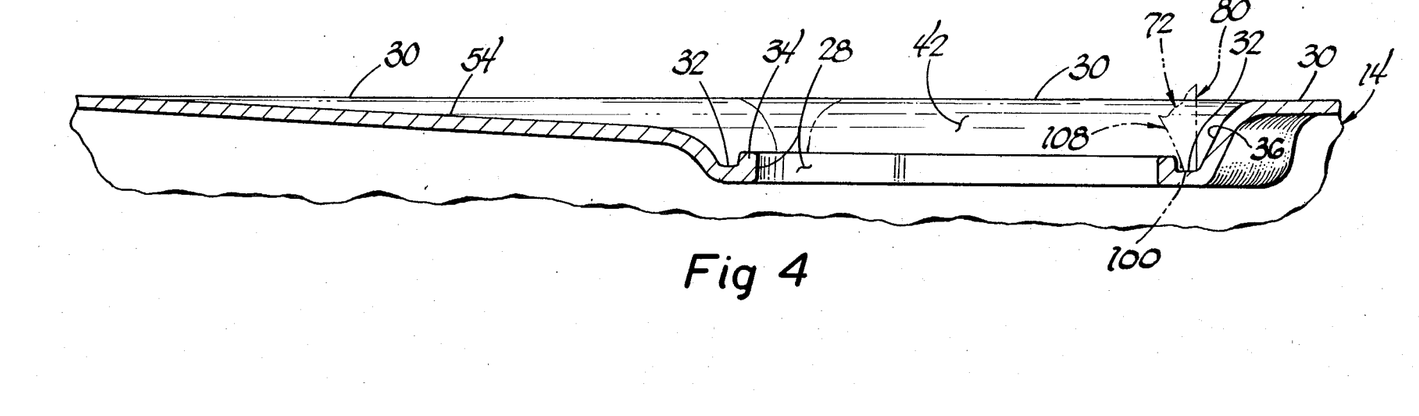
FIG. 4 is a cross-sectional view taken generally on the plane of line 4—4 of FIG. 3 and looking in the direction of the arrows.

FIG. 3, a relatively enlarged elevational view of a fragmentary portion of body quarter panel 14, illustrates such body panel 14 having an outer surface 30 of a generally continuous blending configuration with a portion thereof generally indented inwardly, with respect to the vehicle. Such indented portion is depicted as comprising a generally vertically extending planar wall portion 32 which at its generally inner periphery terminates as in an outwardly (with respect to the vehicle) extending flange-like portion 34 which also serves to define the air intake or inlet aperture or passage 28.

As possibly best illustrated in FIGS. 3, 4, 5 and 6, the planar wall portion 32 is joined to a rearwardly disposed transitional wall portion 36 which slopes generally toward the rear (of the vehicle) as it extends from planar wall 32 outwardly to generally blendingly join the outer contour or surface 30 of the body panel means 14. As generally depicted in FIG. 3, the phantom line 38 is intended to indicate the general juncture of planar wall 32 and inclined wall portion 36 while the phantom line 40 is intended to indicate the general juncture of inclined wall 36 with the outer contour or surface 30 of the body panel means 14. As can be seen in FIG. 3, the sloping wall portion 36 also, from bottom to top, slopes generally rearwardly of the vehicle 10. A second upwardly disposed transitional wall portion 42 is sloped generally outwardly and upwardly (with respect to the vehicle) as it extends from the planar wall portion 32 to generally blendingly join the outer contour or surface 30 of the body panel means 14. As generally depicted in FIG. 3, the phantom line 44 is intended to indicate the general juncture of planar wall portion 32 and the inclined wall 42 while the phantom line 46 is intended to indicate the general juncture of inclined wall 42 with the outer contour or surface 30 of body panel means 14. Similarly, a third downwardly disposed transitional wall portion 48 is sloped generally outwardly and downwardly (with respect to the vehicle) as it extends from the planar wall portion 32 to generally blendingly join with the outer contour or surface 30 of the body panel means 14. As generally depicted in FIG. 3, the phantom line 50 is intended to indicate the general juncture of planar wall portion 32 and the inclined transitional wall 48 while the phantom line 52 is intended to indicate the general juncture of inclined wall 48 with the outer contour or surface 30 of body panel means 14.

As possibly best seen in FIG. 3, the phantom lines 40 and 46 as well as the phantom lines 44 and 38 join each other in a curvilinear manner indicating the formation of a rounded or curvilinear corner area joining such transitional walls 36 and 42. Similarly, phantom lines 40 and 52 as well as the phantom lines 38 and 50 join each other in a curvilinear manner indicating the formation of a rounded or curvilinear corner area joining such transitional walls 36 and 48.

As shown in each of FIGS. 3, 4, 5 and 6, a generally forwardly (with respect to the vehicle) disposed relatively elongated inclined transitional wall 54 extends from the contour or surface 30, at its forward-most portion, and slopes inwardly until it joins the planar wall portion 32. With reference to FIG. 3: phantom line 56 is intended to generally indicate generally where transitional wall 54 joins planar wall portion 32; phantom line 58 is intended to generally indicate generally where transitional wall 54 joins the upper transitional wall 42; and phantom line 59 is intended to generally indicate where inclined transitional wall 54 joins the lower inclined transitional wall 48.

With reference to FIG. 3, a pair of openings 60 and 62 may be formed through the wall portion 32 as to form the back side of panel 14, accept therein generally flanged square plastic threaded or threadable nut members (not shown but well known in the art) for securing the air scoop of the invention in an assembled condition to body panel means 14.

Figure 5:
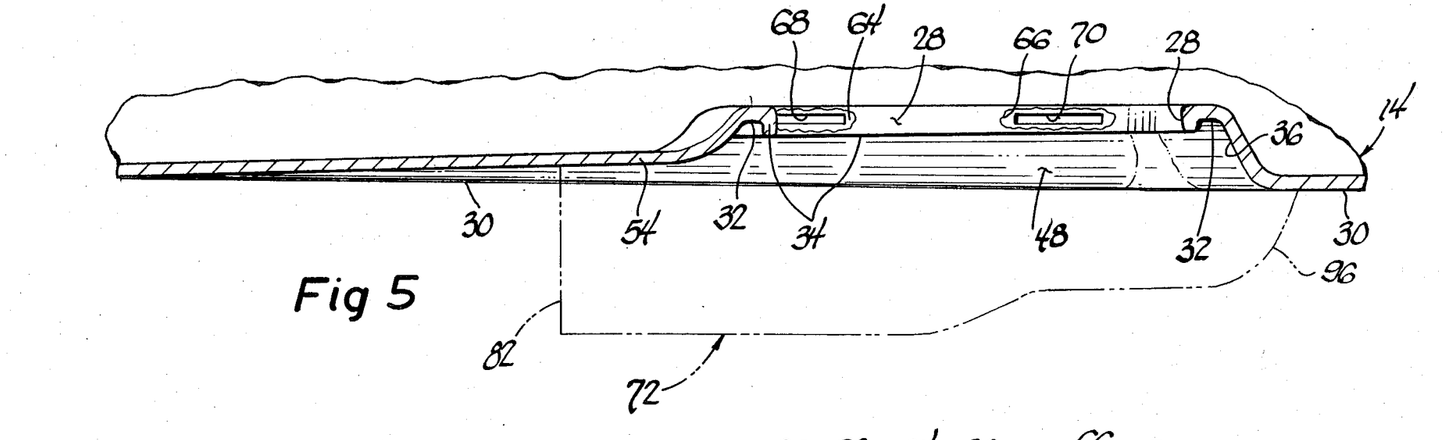
FIG. 5 is a cross-sectional view taken generally on the plane of line 5—5 of FIG. 3 and looking in the direction of the arrows.
Figure 6:
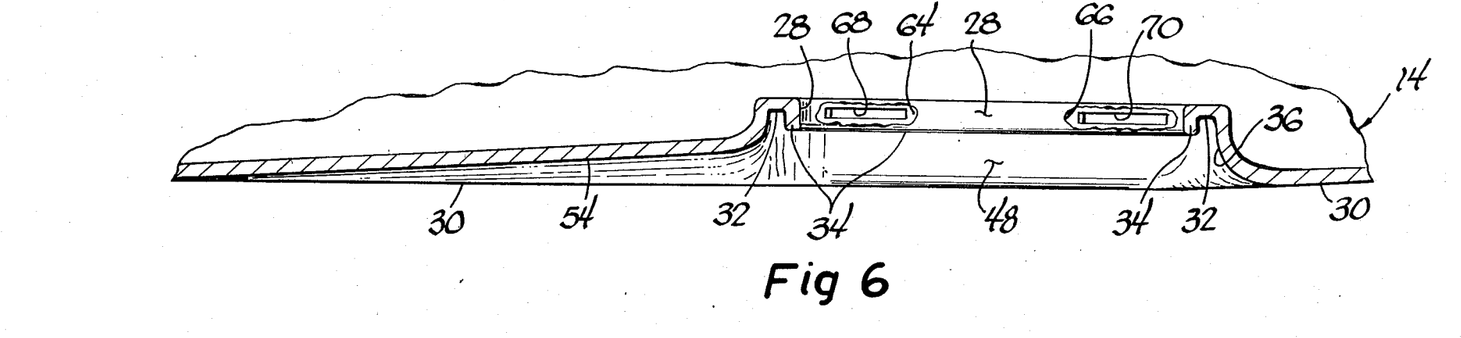
FIG. 6 is a cross-sectional view taken generally on the plane of line 6—6 of FIG. 3 and looking in the direction of the arrows.

In FIGS. 5 and 6, portions of the flange portion 34 are broken away as at 64 and 66 to better show slots 68 and 70 which may be formed through the lower inclined transitional wall 48. Such slots or openings 68 and 70, as will become more clear, may be employed to respectively receive retainer means as in the form of arms or tabs carried by the air scoop means of the invention.

Referring now in greater detail primarily to FIGS. 7, 8, 9, 10, 13 and 17, an air scoop means 72 embodying teachings of the invention is illustrated as comprising, preferably, a unitary molded air scoop housing means comprising top wall means 74 and side wall means 76 and 78, each integrally formed with the top wall means 74, and rearward end wall means 80 also integrally formed with the top wall means 74 as well as with the side wall means 76 and 78.

Figures 11, 12, 13, 14:
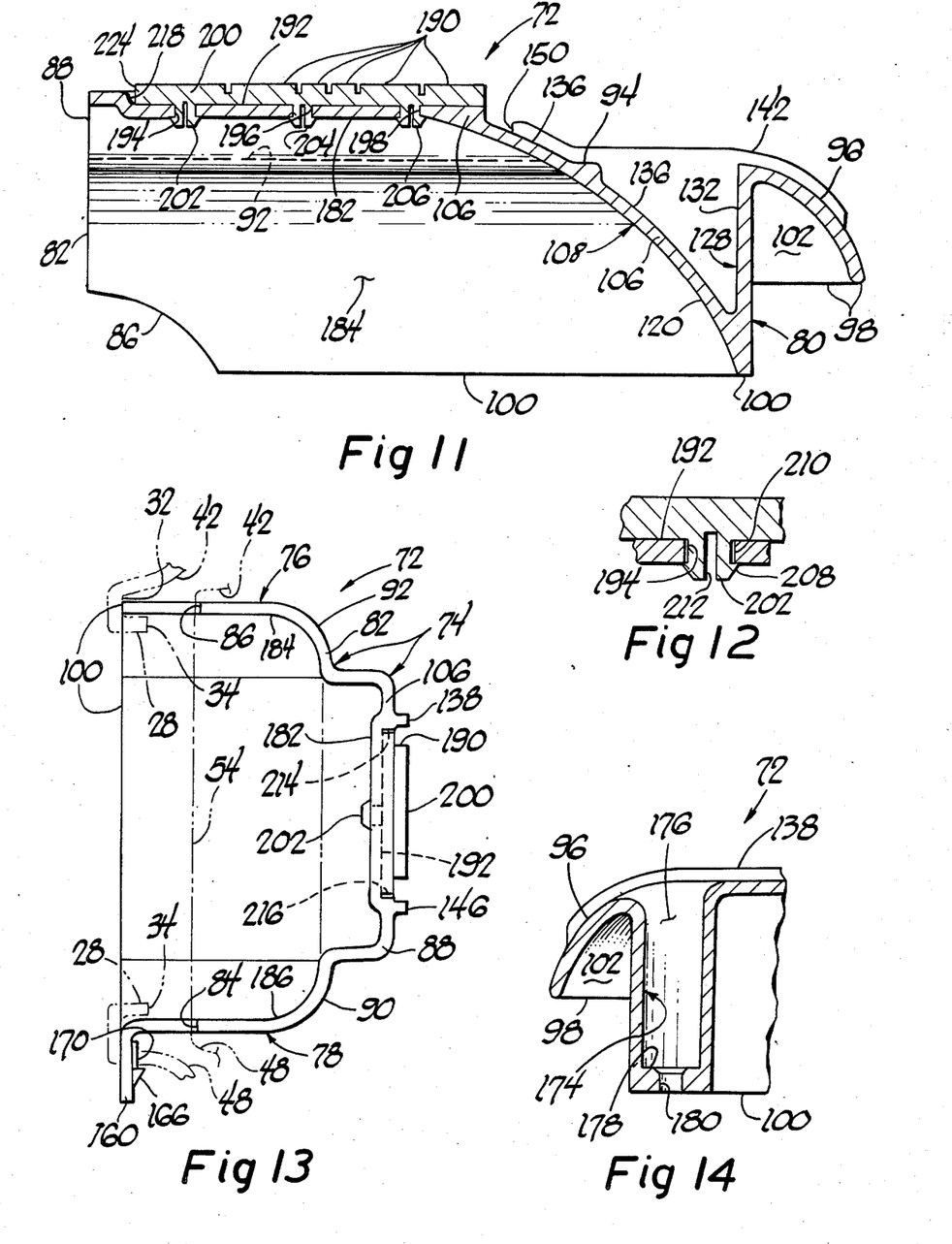
FIG. 11 is a cross-sectional veiw taken generally on the plane of line 11—11 of FIG. 7 and looking in the direction of the arrows.
FIG. 12 is an enlarged view of a fragmentary portion of the structure of FIG. 11.
FIG. 13 is a view taken generally on the plane of line 13—13 of FIG. 7 and looking in the direction of the arrows.
FIG. 14 is a view of a fragmentary portion of the structure shown in FIG. 7 and taken generally on the plane of line 14—14 of FIG. 7 and looking in the direction of the arrows.

As best seen in FIG. 13 the forward end 82 of the housing means is open with side walls 78 and 76 being preferably formed with respective relieved portions 84 and 86 which respectively accommodate the juxtaposed curvature of walls 48 and 42 (FIGS. 3 and 4) when assembled thereto. As shown, for example, in FIGS. 7, 8, 9, 11 and 13, the upper or top wall means 74 preferably comprises a relatively elevated generally medially situated portion 88 which extends longitudinally for some distance along the housing means 72. Further, the top wall means 74 preferably comprises curved wall portions 90 and 92 respectively disposed at opposite sides of medial portion 88 as to integrally blend with such medial portion 88 and, respectively, with side wall means 78 and 76. As possibly best seen in FIGS. 7 and 8, the relatively raised medial portion 88, at its rearward portion and at its outer surface effectively blends with a transverse wall portion 94 which extends between and is coplanar with the top surfaces of wall portions 90 and 92.

As possibly best seen in FIGS. 7, 8, 9 and 10, top or upper wall portions 90 and 92 each extend rearwardly and ultimately curve downwardly (as viewed in FIG. 8) defining an overhanging extension 96 terminating as in an edge surface 98. As can be seen in any of FIGS. 8, 9, 11, 14, 17, 18 or 19, in the preferred embodiment the edge surface 98 is relatively elevated (as viewed in FIG. 8) above the bottom edge surface 100 of wall means 76, 78 and 80. This, in turn, enables the portion 96 to extend rearwardly beyond surface 36 (FIGS. 3 and 4) of the associated vehicle body panel means 14 and assume at least a close relationship to the contour of the juxtaposed contour of such body panel means 14 when the housing or scoop means 72 is mounted to the vehicle 10.

As shown in each of FIGS. 9, 10, 11, 14, 18 and 19, the curved rearward extension 96 is comprised of a wall section or portion which, in extending rearwardly beyond the rearward wall means 80, creates a pocket-like space 102 between itself and rearward wall means 80. Further, in the preferred embodiment, the right most or rearward most end of side wall means 76 (as viewed in FIG. 7) may be curved, as at 104 (FIGS. 9 and 17), as it joins the curved rearward extension 96.

As generally depicted in FIGS. 9, 11, 18 and 19, the upper wall portion 106 of upper extension 88 can be considered as not only blending with transverse wall portion 94 but also extending in an arcuate configuration as to join with and blend into rearward wall means 80 thereby defining an interior arcuate or curvilinear surface means, 108. Further, in the preferred embodiment, the arcuate surface means 108 is not of uniform curvature. That is, in FIG. 10 it can be seen that in the preferred embodiment rearward wall means 80 is of a step-like configuration and that the arcuate surface means 108, which may be of uniform curvature as in the general vicinity of phantom line 110, nevertheless assumes differing curvatures as the wall 106 blends into stepped portions 112, 114 and 116 of rearward wall means 80. Such differing curvatures of arcuate surface means 108 are generally depicted at 118, 120 and 122 of FIG. 10 (with respective blending between such differing curvatures occurring as generally depicted by lines 124 and 126 of FIG. 10).

Generally, the curvature of arcuate surface portion 118 (as shown in both FIGS. 10 and 18) would be of the sharpest bend and the curvature of arcuate surface portion 122 (as shown in both FIGS. 10 and 19) would be of the least amount of bend (greatest sweep) while the curvature of arcuate surface portion 120 (as shown in both FIGS. 10 and 11) would be greater than that of surface portion 122 but less than that of surface portion 118.

Figure 7:
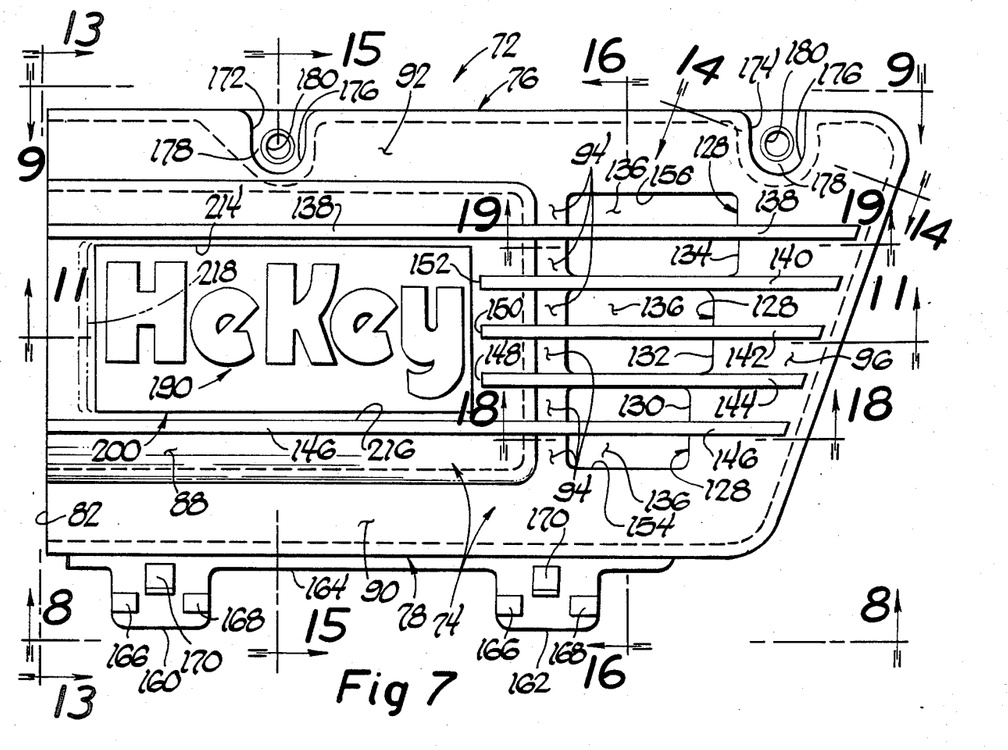
FIG. 7 is an elevational view of an air scoop employing teachings of the invention.
Figure 8:
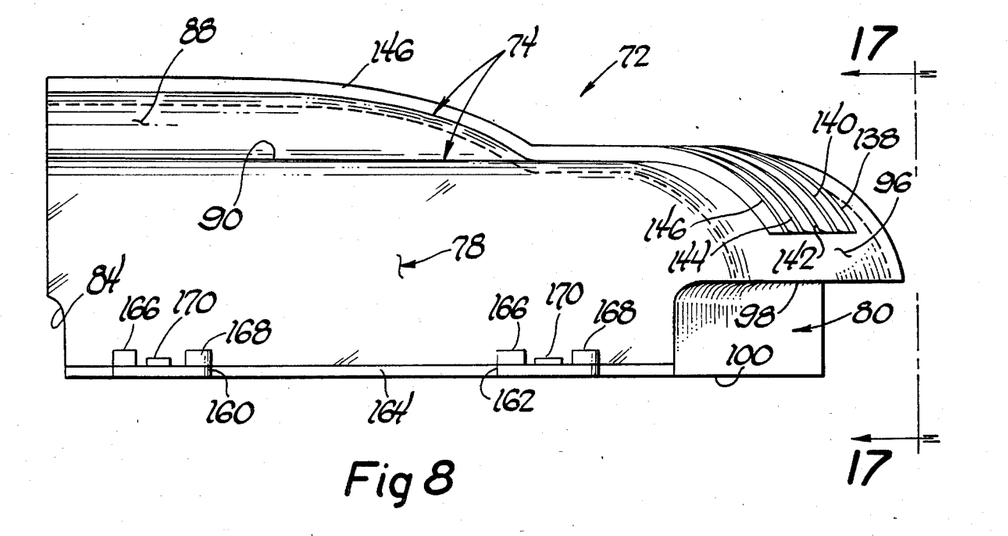
FIG. 8 is a view taken generally on the plane of line 8—8 of FIG. 7 and looking in the direction of the arrows.
Figure 9:
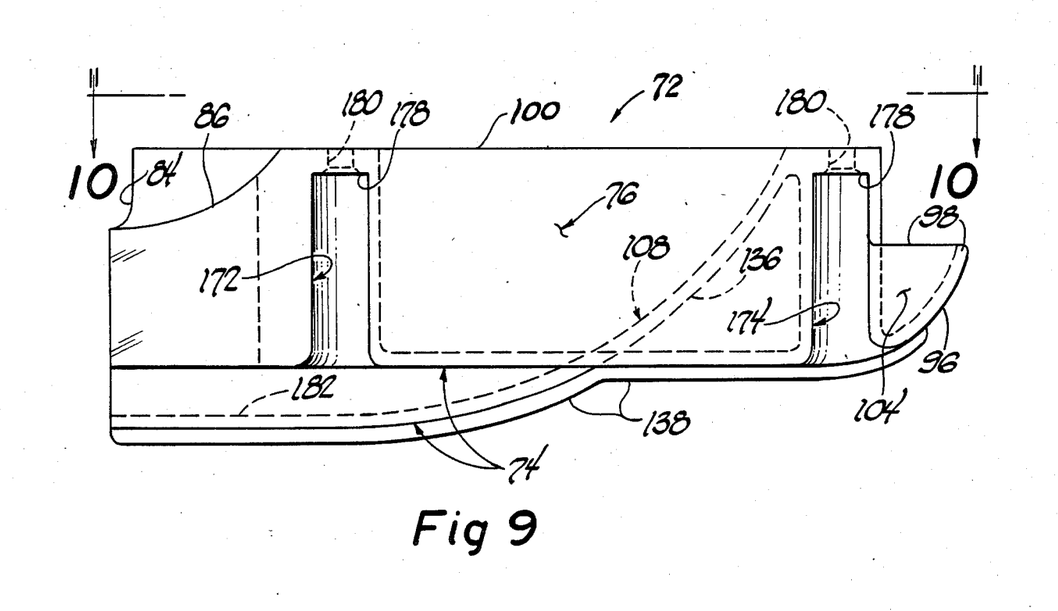
FIG. 9 is a view taken generally on the plane of line 9—9 of FIG. 7 and looking in the direction of the arrows.
Figure 10:
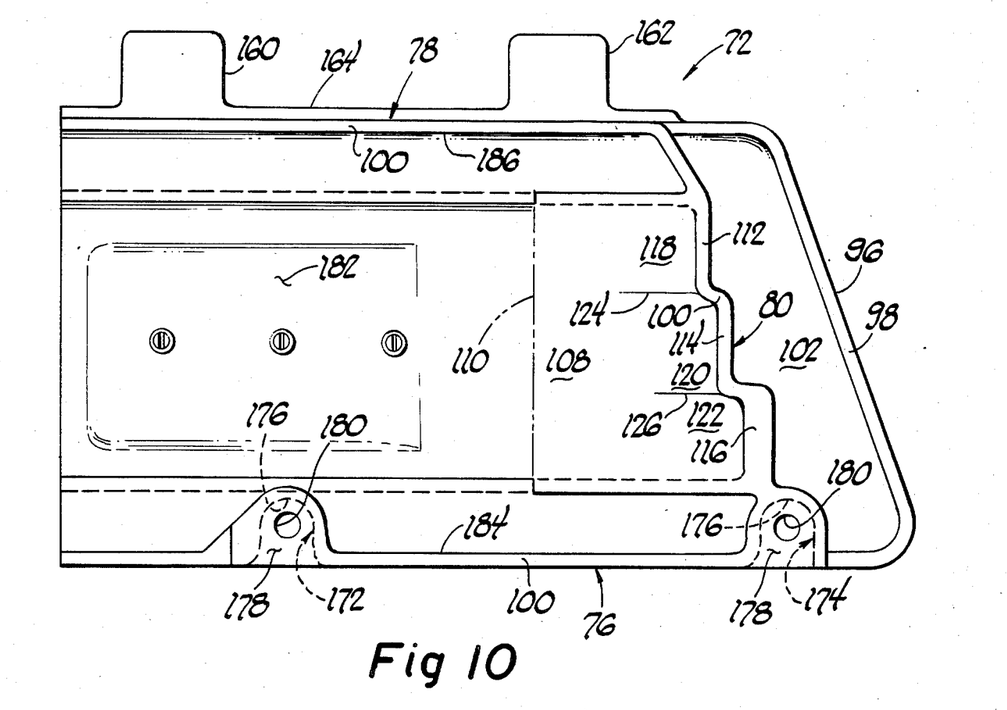
FIG. 10 is a view taken generally on the plane of line 10—10 of FIG. 9 and looking in the direction of the arrows.

As possibly best seen in FIGS. 9, 10, 11, 18 and 19, in the preferred embodiment of the air scoop means 72, the rearward wall means extends generally vertically of the lower edge surface 100 and generally perpendicularly to the longitudinal extent of the air scoop means 72. Further, in the preferred embodiment, the rearward end wall means 80 also defines what may be referred to as inner surface means 128 which is also preferably vertical with respect to the lower edge surface 100 and generally perpendicular to the longitudinal extent of the air scoop means 72. As best illustrated in FIG. 7, such inner surface means is comprised of inner surface segments or portions 130, 132 and 134 respectively lying in planes which are generally parallel to each other and spaced from each other as to have: inner surface portion 130 relatively most forwardly disposed; inner surface portion 132 relatively less forwardly disposed; and inner surface portion 134 relatively most rearwardly disposed.

Figure 18:
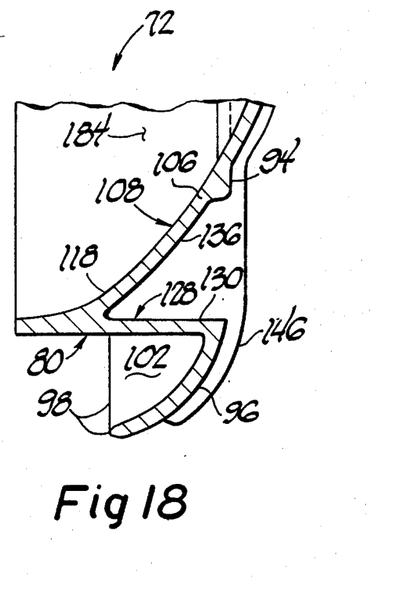
FIG. 18 is a cross-sectional view of a fragmentary portion of the structure of FIG. 7 taken generally on the plane of line 18—18 of FIG. 7 and looking in the direction of the arrows.
Figure 19:
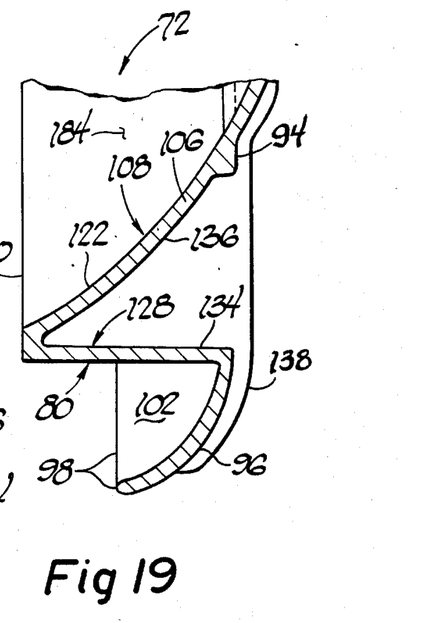
FIG. 19 is a cross-sectional view of a fragmentary portion of the structure of FIG. 7 taken generally on the plane of line 19—19 of FIG. 7 and looking in the direction of the arrows.

As shown in any of FIGS. 11, 18 and 19, the curvilinear wall 106 is preferably formed as to have a generally curvilinear outer surface 136, generally similar to that of inner surface means 108. Such outer curvilinear surface 136 may extend as from the rearward portion of the top most portion of upper extension 88 and continue rearwardly and inwardly (as in a direction generally toward surface means 100). As depicted in FIG. 11, the transverse wall portion 94 may appear as an interruption to the otherwise continuous curvilinear profile of outer surface means 136. As shown in FIGS. 11, 18 and 19 the surface 136 joins with surface segments or portions 130, 132 and 134.

Further, in the preferred embodiment of the air scoop means 72, a plurality of fin-like or rib-like means 138, 140, 142, 144 and 146 are provided so as to extend generally longitudinally of the air scoop means 72. At the respective rearward most portions all of such fins 138, 140, 142, 144 and 146 may also be curved as to generally follow the curvature of the curved rearward extension 96. As will be noted, for example, in FIGS. 7, 8, 9, 16 and 17, the outboard fins 138 and 146 extend to the forward end 82 of the air scoop means 72 while the inboard fins 140, 142 and 144 extend forwardly for only a portion of the overall length of air scoop means 72 and terminate short of the full upper curvilinear surface 136, and at an elevation above transverse wall portion 94, as at ends 148, 150 and 152.

Each of the fin or ribs 138, 140, 142, 144 and 146 also extends downwardly (or inwardly) of what may be considered the pocket or cavity cooperatively formed generally by the curvilinear surface means 136 joining the inner surface means 128 of rearward end wall means 80 as to be integrally formed therewith as depicted, for example, in FIGS. 16, 11, 18 and 19. Further, as best viewed in FIGS. 7 and 16, fins or ribs 140 and 144 are preferably located as to be in respective positions which might otherwise be considered the juncture of surface portions or segments 134 and 132 of inner end wall surface means 128 and the juncture of surface portions or segments 132 and 130 of said surface means 128. As possibly best seen in FIG. 16, side wall portions 154 and 156, respectively integrally formed with upper wall portions 90 and 92, depend downwardly (or inwardly of the scoop means 72) and are each integrally joined to the curvilinear surface 136 as well as to inner surface means 128 of rear wall means 80. Therefore, keeping this in mind and for the moment considering fins or ribs 138, 142 and 146 as none existant, it can be seen that a plurality of pockets, recesses or chambers would be cooperatively defined by side wall portions 154 and 156, curvilinear surface means 136, end surface means 128 and ribs or fins 140 and 144. That is, more particularly: (a) a first of such recesses would be cooperatively defined by side wall portion 156, curvilinear surface 136, end wall surface portion 134 and rib or fin 140; (b) a second of such recesses would be cooperatively defined by rib or fin 140, curvilinear surface 136, rib or fin 144 and end wall surface portion 132 while (c) a third of such recesses or cavities would be cooperatively defined by rib or fin 144, curvilinear surface 136, side wall portion 154 and end wall surface portion 130.

Now, with the foregoing in mind, it is easy to realize that in the preferred embodiment, as generally depicted in FIGS. 7, 11, 16, 18 and 19, the remaining ribs or fins 138, 142 and 146 respectively pass through and extend generally medially of such respective recesses or pockets and, as best seen in FIGS. 11, 18 and 19, also have portions extending inwardly as to integrally join to the curvilinear outer surface 136 and respectively integrally joined to rear surface portions or segments 134, 132 and 130.

In the preferred embodiment a pair of tabs or arm-like retainer means 160 and 162 are preferably provided integrally formed with side wall means 78 and such tabs 160 and 162 may be integrally formed as with a longitudinally extending flange portion 164 which, in turn, is integrally formed with side wall means 78. Each of the tabs 160 and 162 may be provided with integrally formed generally upstanding latch or detent-like portions 166 and 168 along with a spacer-like pad portion 170.

In somewhat of a contrast, side wall means 76 is preferably formed with longitudinally extending recesses 172 and 174, each of which may comprise a curvilinear or cylindrical-like portion 176 for the length thereof. At the lower end (as viewed in either FIG. 14 or 15) of each of such recesses 172 and 174, an integrally formed transverse body or wall portion 178 is provided with a passage 180—180 therethrough with such passages 180—180 being effective to receive therethrough cooperating fastening means such as, for example, suitable bolts or screws (not shown).

OPERATION OF THE INVENTION

Generally, the interior surface means 184 of side wall means 76, the interior surface means 182 of upper wall means 106; the curvilinear inner surface means 108 of the wall means 106 and the inner surface means 186 of side wall means 78, as well as other interior surface means effectively interconnecting such, cooperate to define passage like means for the flow of air therethrough when the air scoop means 72 of the invention is operatively connected or secured to the body panel means 14 as to effectively, in the most part, surround the air inlet port 28.

When the air scoop means 72 of the invention is operatively secured to the body panel means 14 it would assume a position as generally depicted in phantom line at 72 of FIG. 5. More specifically, in assembling the air scoop means 72 to the body panel means 14, the air scoop means 72 is preferably held at somewhat an inclined angle, while generally longitudinally aligned with the vehicle 10, and tabs or arm-like retainers 160 and 162 are respectively inserted into slots 68 and 70 (FIGS. 5 and 6) of body panel means 14 and as the tabs 160 and 162 progressively pass into the slots 68 and 70 the air scoop means 72 is simultaneously brought into a progressively more vertical-like position. This procedure, in effect, continues until eventually: (a) surface 100 of rearward end wall means 80 becomes effectively seated as against planar wall portion 32, generally between flange 34 and wall portion 36 of body panel means 14, as generally fragmentarily depicted in phantom line at 72, 80, 100 and 108 of FIG. 4; (b) surface 100 of side wall means 78 becomes effectively seated as against planar wall portion 32, generally between flange 34 and wall portion 48 of body panel means 14 and (c) surface 100 of side wall means 76 becomes effectively seated as against planar wall portion 32, generally between flange 34 and wall portion 42. When this is achieved the pad-like portions 170 of tabs 160 and 162 are generally firmly contained within respective slots 68 and 70 with the upstanding portions 166 and 168 serving to prevent the unintentional withdrawal of such tabs 160 and 162 from the respective slots 68 and 70. This is also generally depicted in phantom line at 42—42, 32, 34—34, 28—28 and 48—48 of FIG. 13. The screws or bolts (not shown) may then be respectively inserted through passages 180—180 of recess 172 and 174 as to threadably engage suitable anchoring or retainer means situated generally in openings 60 and 62 of planar wall portion 32 (FIG. 3). When the air scoop means 72 of the invention is thusly assembled and secured to the body panel means 14, the forward open end 82 of scoop means 72 extends for a substantial distance forwardly of the region generally illustrated in phantom line at 56 of FIG. 3 and actually extends over a portion of the sloping surface 54 of the panel means 14. That is why the side walls 76 and 78 are respectively provided with contoured relieved or cut-out portions 86 and 84 so as to thereby at least closely accommodate the contour of the juxtaposed portions of walls 42 and 48 and/or the wall 54 as well as the possible compound curvature arising from the junctures of walls 42 and 48 with wall 54. This is also generally depicted in phantom line at 54, and phantom line extensions thereof at 42 and 48 of FIG. 13.

In view of the foregoing it can be seen that in the preferred embodiment of the invention, the air scoop means 72, when operatively connected to the body means as hereinbefore described, effectively encompasses three sides of the flange 34 and thereby in no way reduces the effective flow area of air intake port 28 which is actually peripherally defined by the flange 34.

When the air scoop means 72 is affixed as to the side body panel means 14 of a vehicle 10: the side wall means herein previously identified as 76 may actually be considered the top or upper wall means; the side wall means herein previously identified as 78 may actually be considered as the bottom or lower wall means; and the top or upper wall means herein previously identified as 74 and/or 90 and 92 may actually be considered as the side wall means. Further, the forward end 82 of the scoop means 82 is that end directed generally in the same direction as the forward end of the vehicle and toward the air as the vehicle 10 is under forward motion.

As should now be completely apparent, when the vehicle 10, equipped with the air scoop 72 of the invention, is moving forwardly the air passing along side the vehicle (which air is at a lesser static air pressure with respect to the vehicle) is in effect rammed into the open forward end 82 of the air scoop means 72 and kinetically forced to flow through the herein previously defined interior passage means of scoop means 72 and caused to gradually change direction by surface means 108 (thereby minimizing any pressure losses) from where it is discharged into air intake port means 28 and continues its at least somewhat pressurized flow via air induction passage means 26 and 24 (FIG. 2) to the induction system of the engine 18.

It should also be noted that as a vehicle is moving forwardly through air, the air is effectively to a substantial degree impacted and forced to move some amount laterally away from the sides of the vehicle body. The precise degree of such lateral displacement of air and the area or areas of the vehicle where such lateral displacement is occurring are functions of at least the speed of the vehicle and the contour of the vehicular body panels as well as the weight of the passengers and cargo carried by the vehicle which causes a variation in the angle of attack of the vehicle with respect to the air. Further cross-winds blowing against the right side of the vehicle 10, as depicted in FIG. 1, would also increase the magnitude of relative vacuum (reduced air pressure) at the left side of the vehicle which would further encourage the lateral displacement of air outwardly from the left side of the FIG. 1 vehicle 10. The air scoop means 72 by having its forward open end 82 extending laterally outwardly a substantial distance away from the body panel means 14, as generally depicted in phantom line in FIG. 5 minimizes the deleterious effects of such lateral displacement of air (from whatever causes) because the scoop means 72 extends laterally outwardly a distance sufficient to cause even such laterally displaced air to be effectively kinetically impacted into the open forward end 82 of scoop means 72 and ultimately (as hereinbefore described) discharged into air intake port 28.

It should be noted that the ribs or fins 138, 140, 142, 144 and 146 integrally joined to wall means 80 and 106 cooperatively serve to define a very strong structure which, in turn, enables the provision of the rearwardly disposed overhanging curved extension 96 which although is not functionally involved in delivering air to the air intake port 28 nevertheless serves to provide a substantial degree of streamlining and thereby reduce air drag on the vehicle 10 in such vicinity. An ancillary benefit of such curved extension is to enhance the aesthetic qualities of the scoop means 72 when operatively affixed to the vehicle.

As yet a further aspect of the preferred embodiment of the invention has not been described. That is, many vehicle owners like to somehow or in someway customize their vehicles and in many instances such customizing includes symbols, designs, names and/or other indicia for which the vehicle owner has a personal preference.

More specifically, the preferred embodiment of the invention contemplates the provision of an area generally atop the upper extension 88 for the placement of a selected symbol, design or name (hereinafter singly and collectively referred to as "identification indicia") as by the owner of the vehicle to which the air scoop means 72 is secured. By way of example, and not of limitation, the owner's name may be "HEKEY" as indicated generally at 190 of FIG. 7 and such may be formed as by painting embossing or the like.

Figure 15:
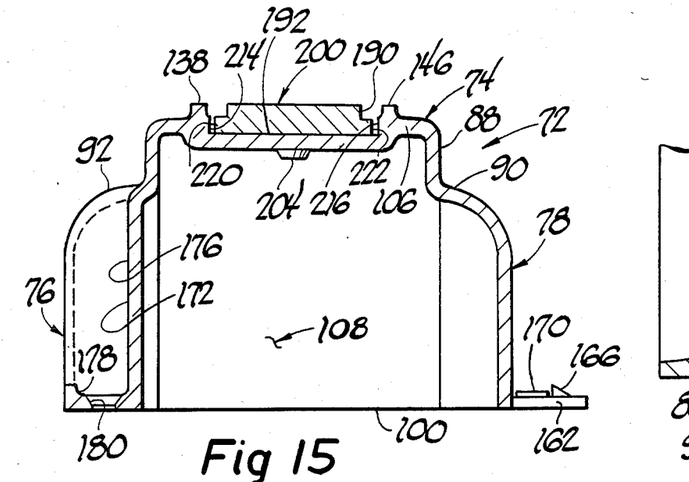
FIG. 15 is a cross-sectional view taken generally on the plane of line 15—15 of FIG. 7 and looking in the direction of the arrows.
Figure 16:
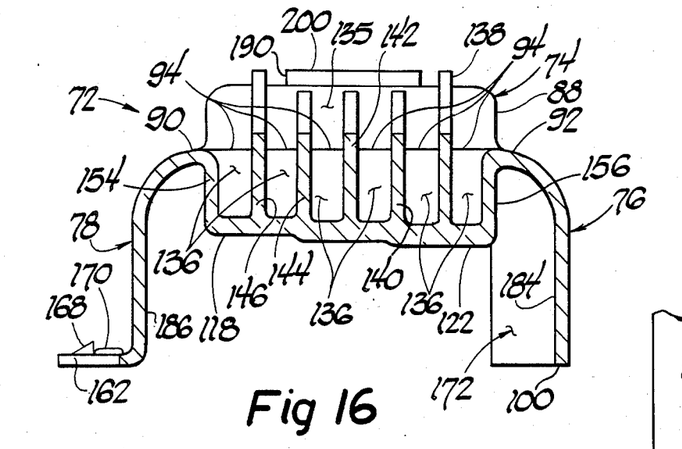
FIG. 16 is a cross-sectional view taken generally on the plane of line 16—16 of FIG. 7 and looking in the direction of the arrows.
Figure 17:
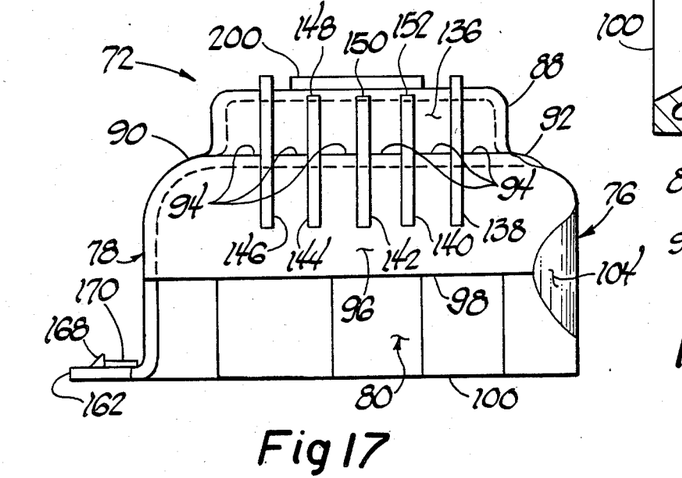
FIG. 17 is a view taken generally on the plane of line 17—17 of FIG. 8 and looking in the direction of the arrows.

Further, in the preferred embodiment of the invention, it is contemplated that such "identification indicia" may, from time-to-time be desired to be changed. Accordingly, it is further contemplated that in the preferred embodiment of the invention the upper wall 106, in the region of the extension 88 be provided with a recessed-like surface 192 through which a plurality of apertures or passages 194, 196 and 198 are formed as best illustrated in FIGS. 11, 12 and 15. Further it is contemplated that the "identification indicia" be suitably formed on plate means 200 (which may be of molded plastic or any other suitable material) provided as with split projecting retainer portions 202, 204 and 206 respectively received through apertures or passages 194, 196 and 198. As typically illustrated in FIG. 4, each of the retainers may be comprised of a generally conical projecting end 208 and a relatively necked-down cylindrical portion 210 both of which are formed with a transverse slot 212 therethrough enabling the conical portion 208 to be compressed as it passes through its cooperating passage as, for example, 194.

As depicted in FIGS. 7, 11, 13 and 15, the recessed surface 192 may be generally peripherally confined as by side walls 214 and 216 and a forwardly disposed curved wall portion 218. The plate or "identification indicia" body means 200 may have side walls 220 and 222 at least respectively closely juxtaposed to side walls 214 and 216 and a forward end wall 224. In the preferred embodiment, the "identification indicia" would be integrally formed with the main body means 200 or, for example, adhesively secured thereto and such "identification indicia" 190 could be situated generally inwardly of the side walls 220 and 222 as generally depicted in FIGS. 7, 13, 15 and 16.

Although only a preferred embodiment of the invention has been disclosed and described, it is apparent that other embodiments and modifications of the invention are possible within the scope of the appended claims.

What is claimed is:

1. An air scoop for use in combination with a vehicle having vehicular body panel means and an engine with air intake port means formed in said body panel means and communicating with the air induction means of said engine, said air scoop means comprising first and second side wall means upper wall means and rearward end wall means, wherein said first and second side wall means said upper wall means and said rearward end wall means are interconnected, wherein said air scoop means comprises an open forward end and a rearward discharge end, wherein when said air scoop means is operatively secured to said body panel means said first and second side wall means and said rearward end wall means effectively encompass said air intake port means therebetween, said air scoop means further comprising internal passage means for the flow of air from said open forward end to said rearward discharge end, wherein at least a portion of said internal passage means is of a curvilinear configuration as to curvingly direct the flow of air toward said air intake port means, wherein said curvilinear configuration of said internal passage means is defined at least in part by the interior surface of said upper wall means, wherein said interior surface of said upper wall wall means comprises a plurality of adjacently situated arcuate surfaces each for curvingly directing said flow of air toward said air intake port means, wherein said plurality of arcuate surfaces are discrete from each other and are operatively interconnected by integrally formed transitional interior surface portions, and wherein said plurality of arcuate surfaces are staggered with respect to each other as to be progressively further rearwardly of said air scoop means.

2. An air scoop for use in combination with a vehicle having vehicular body panel means defining body panel exterior surface means and an engine with air intake port means formed in said body panel means and communicating with the air induction means of said engine, said air scoop means comprising first and second side wall means upper wall means and rearward end wall means, wherein said first and second side wall means said upper wall means and said rearward end wall means are interconnected, wherein said air scoop means comprises an open forward end and a rearward discharge end, wherein when said air scoop means is operatively secured to said body panel means said first and second side wall means and said rearward end wall means effectively encompass said air intake port means therebetween, said air scoop means further comprising internal passage means for the flow of air from said open forward end to said rearward discharge end, wherein at least a portion of said internal passage means is of a curvilinear configuration as to curvingly direct the flow of air toward said air intake port means, wherein said upper wall means has an external surface of generally curvilinear configuration extending generally rearwardly of said air scoop and slopes toward said body panel exterior surface means, and wherein said external surface of generally curvilinear configuration terminates in said rearward end wall means as to thereby define externally accessible recess means between said external surface of generally curvilinear configuration and said rearward end wall means.

3. An air scoop for use in combination with a vehicle having vehicular body panel means defining body panel exterior surface means and an engine with air intake port means formed in said body panel means and communicating with the air induction means of said engine, said air scoop means comprising first and second side wall means upper wall means and rearward end wall means, wherein said first and second side wall means said upper wall means and said rearward end wall means are interconnected, wherein said air scoop means comprises an open forward end and a rearward discharge end, wherein when said air scoop means is operatively secured to said body panel means said first and second side wall means and said rearward end wall means effectively encompass said air intake port means therebetween, said air scoop means further comprising internal passage means for the flow of air from said open forward end to said rearward discharge end, wherein at least a portion of said internal passage means is of a curvilinear configuration as to curvingly direct the flow of air toward said air intake port means, and further comprising a rearwardly directed extension portion extending rearwardly beyond said rearward end wall means, said extension portion terminating in extension end surface means with said extension end surfaces means being effective to be in general juxtaposition to said body panel exterior surface means at an area rearwardly remote from said air intake port means, said extension portion having a sloping outer surface which slopes toward said body panel exterior surface means of said vehicular body panel means and terminates in said extension end surface means as to thereby reduce air drag during forward movement of said vehicle, wherein said upper wall means has an external surface of generally cirvilinear configuration extending generally rearwardly of said air scoop and slopes toward said body panel exterior surface means, wherein said external surface of generally curvilinear configuration terminates in said rearward end wall means as to thereby define externally accessible recess means, and wherein said extension portion is situated rearwardly of said recess means.

4. An air scoop according to claim 3 and further comprising a plurality of additional wall means situated in said cavity means and joined to said rearward end wall means and to said external surface of generally curvilinear configuration as to thereby provide for additional structural support in such region.

5. An air scoop according to claim 3 and further comprising retainer means carried by said first and second side wall means for securing said air scoop means to said vehicle.

6. An air scoop according to claim 5 wherein said retainer means comprises first and second retainer means, wherein said first retainer means comprises a plurality of tab-like extensions to be received in cooperating slots formed in said body panel means, and wherein said second retainer means comprises a plurality of passages for receiving therethrough respective fastener means for detachable securement to said body panel means.

7. An air scoop according to claim 6 wherein said first retainer means are carried by one of said first and second side wall means, and wherein said second retainer means are carried by the other of said first and second side wall means.

8. An air scoop according to claim 3 wherein said curvilinear configuration of said internal passage means is defined at least in part by the interior surface of said upper wall means.

9. An air scoop according to claim 8 wherein said interior surface of said upper wall means terminates in and with said rearward end wall means.

10. An air scoop according to claim 3 and further comprising identification indicia means carried by said upper wall means.

11. An air scoop according to claim 10 wherein said identification indicia means comprises body means therefor separate from but operatively carried by said upper wall means.

12. An air scoop according to claim 11 and further comprising retainer means operatively carried by said identification indicia body means for securement to said upper wall means.

13. An air scoop according to claim 11 and further comprising retainer means carried by said identification indicia body means, and aperture means formed in said upper wall means, said aperture means being effective to receive said retainer means in order to thereby hold said identification indicia body means in assembled relationship to said upper wall means.

* * * * *